Feb. 15, 1927.
J. N. LESLIE
TIRE CARRIER
Filed July 9, 1926
1,617,766
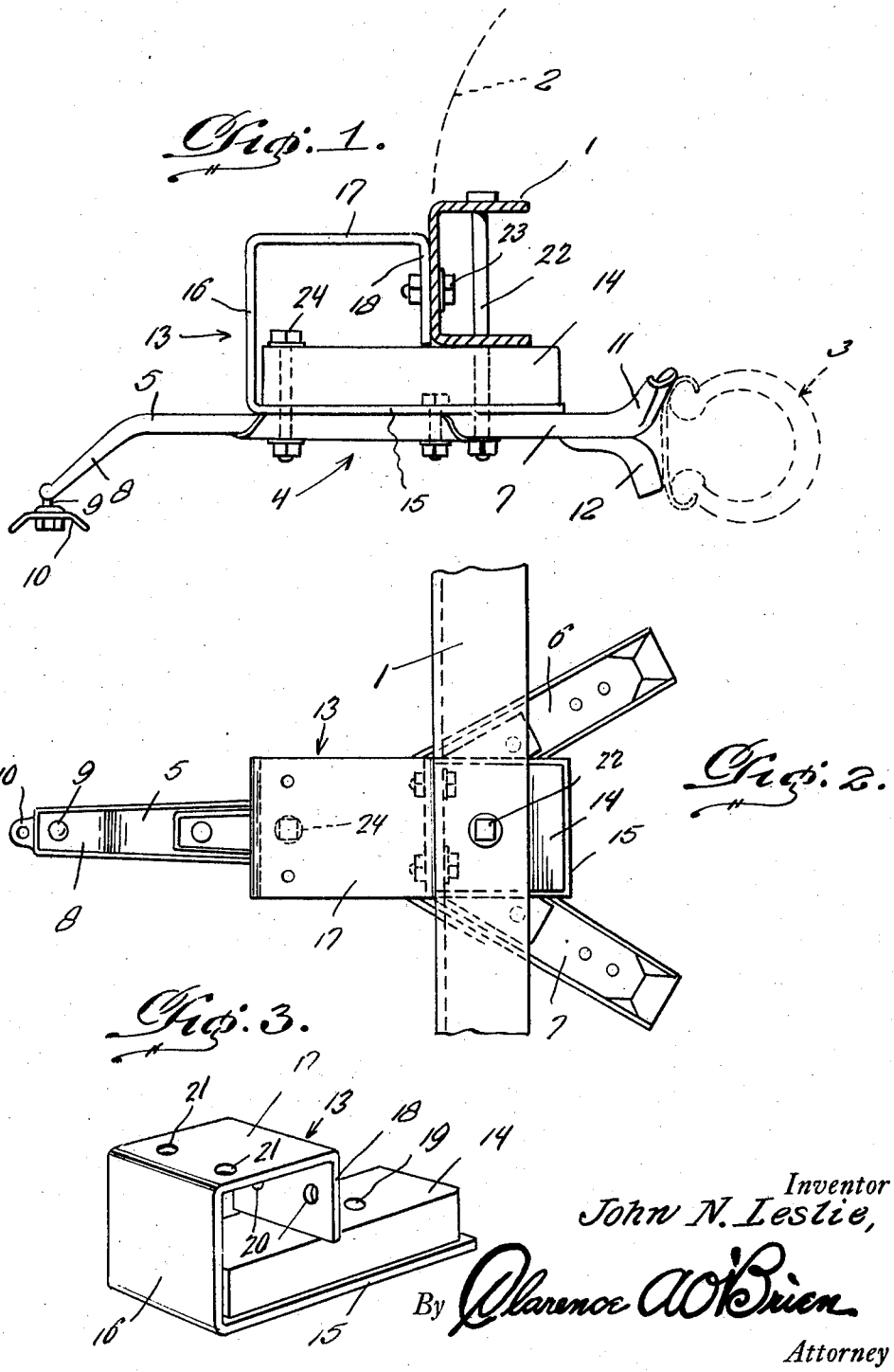
Inventor
John N. Leslie,
By Clarence A O'Brien
Attorney Patented Feb. 15, 1927.

1,617,766

UNITED STATES PATENT OFFICE.

JOHN N. LESLIE, OF COLUSA, CALIFORNIA, ASSIGNOR OF ONE-HALF TO OLE E. RUDD, OF ARBUCKLE, CALIFORNIA.

TIRE CARRIER.

Application filed July 9, 1926. Serial No. 121,372.

This invention relates to an improved spare tire carrier which is especially, although not necessarily, designed for use on the Ford type of automobile, of the kind wherein the customary vertically disposed tire carrier cannot be successfully used.

What I propose to do, is to utilize the ordinary tire carrying spider of the type embodying three radiating arms, two of which are provided at their outer ends with forks for engaging the demountable tire rim, the other one of which is provided at its outer end with a lug clamp.

Carriers of this type are extensively marketed and used on various kinds of Ford automobiles at the present time, and thus they are usually disposed in a vertical position, thus making it necessary to carry spare tires in a corresponding position.

Certain kinds of Ford automobiles, particularly of the truck type prohibit the use of tire carriers of this nature. Therefore, I have evolved and produced a novel little device which permits the ordinary tire carrier to be detached from its vertically disposed position and arranged in horizontal position beneath the chassis, whereby to permit the spare tire to be supported in a horizontal plane and in an out-of-the-way position.

My principal object aims to provide an exceptionally simple and inexpensive device for converting the conventional tire carrier in this manner, so that the same is rigidly supported from the chassis in such a way as to dispose the spare tire out of the way and yet permit it to be conveniently put in position or removed.

Other objects and advantages of the invention will become apparent from the following description and the drawings.

In the accompanying drawing forming a part of this application and in which like numerals are employed to designate like parts throughout the same:—

Figure 1 is an elevational view of a device constructed in accordance with this invention, showing the approximate manner in which it is attached to the automobile and also showing the manner in which the tire cooperates therewith.

Fig. 2 is a top plan view of the same, with portions broken away.

Fig. 3 is a detail perspective view of the novel attaching bracket constituting the gist of this invention.

Referring to the drawings in detail, the reference character 1 designates the rear cross bar of the automobile chassis frame. The reference character 2 designates the rear end portion of the body of a Ford type of automobile of the design frequently referred to as a roadster. The reference character 3 designates generally the spare tire including the tire casing and the rim.

The reference character 4 designates the conventional tire carrying spider in its entirety. As before indicated, this comprises a plurality of radiating arms 5, 6 and 7. It will be noted that the arm 5 has a downturned rear end portion 8 carrying a clamping device including a threaded bolt or stem 10, and a special clamping nut 10 thereon threaded. The forward ends of the arms 6 and 7 are diverging portions 11 and 12 forming forks for engaging the rim of the demountable tire. It is also plain from Fig. 2, that an auxiliary spider is attached to the main spider to increase the rigidity of construction. However, no undue stress is placed upon the construction of this spider-like carrier for it is of the type now frequently seen on Ford automobiles, and I make no claim to the same, except in combination with my invention.

As before indicated, the primary detail in the disclosure is the attaching device or bracket represented generally by the reference character 13 in Fig. 3. Referring to this figure it will be seen that the bracket comprises an elongated block of wood 14 and a metal strap 15 which is fastened to the under side of the block and which has its opposite end portions bent upwardly as at 16 or forwardly as at 17, and downwardly as at 18 to rest upon the central portion of the wooden block.

The metal strips and the block are formed with bolt holes 19, 20 and 21. It will be seen from Fig. 1, that a relatively long bolt 22 extends downwardly through the flanges of the chassis bar 1, the opening 19 and through registered openings in the strap 15 and the tire carrier 4. In addition, a shorter bolt 23 passes through the web of the chassis bar 1, and the downturned end portion 18 of the bracket. In fact, there may be two of these bolts 23 if desired. Then too, another bolt 24 extends downwardly through bolt hole formed in the rear end portion of the wooden block, the strap 15 and an adjacent portion of the tire carrier 4.

It will be obvious from the foregoing description that by taking the conventional tire rack or carrier 4 for removing it from its vertically disposed position, and attaching it to the bracket 13, the bracket may be bolted upon the central portion of the rear cross bar of the chassis 1 and will thus dispose the rack in a horizontal position to support the demountable spare tire in a corresponding plane.

It is believed that by considering the description in connection with the drawings, persons familiar with devices of this kind will be able to obtain a clear understanding of the same. Therefore a more lengthy description is thought unnecessary.

While the preferred embodiment of the invention has been shown and described, it is to be understood that minor changes coming within the field of invention claimed may be resorted to if desired.

Having thus described my invention, what I claim as new is:—

As a new article of manufacture, a bracket adapted to serve as a connector between a spare tire rack and an automobile chassis bar, said bracket comprising an elongated block adapted to bear against the bottom flange of the chassis bar and to extend rearwardly beyond the same, and a metal strap fastened to the under side of the block, having its opposite end extending upwardly and beyond the block, in a direction toward the forward end thereof, and having its free end terminating in a depending attaching portion resting upon the central portion of the block, said attaching portion being adapted to be connected with web of a channel-shaped chassis bar.

In testimony whereof I affix my signature.

JOHN N LESLIE.